(No Model.)

W. L. POTTER.
BELT HOOK.

No. 265,280. Patented Oct. 3, 1882.

Witnesses
John Richter
James J. Greene.

Inventor.
W. L. Potter
By W. E. Simonds
Atty

UNITED STATES PATENT OFFICE.

WILSON L. POTTER, OF HARTFORD, CONNECTICUT.

BELT-HOOK.

SPECIFICATION forming part of Letters Patent No. 265,280, dated October 3, 1882.

Application filed November 15, 1880. Renewed August 21, 1882. (No model.)

*To all whom it may concern:*

Be it known that I, WILSON L. POTTER, of Hartford, in the county of Hartford and State of Connecticut, have invented certain new and useful Improvements pertaining to Belt-Hooks, of which the following is a description, reference being had to the accompanying drawings, where—

Figure 1:
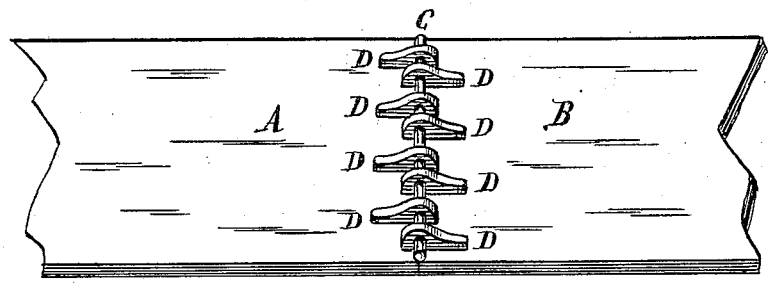
Figure 2:
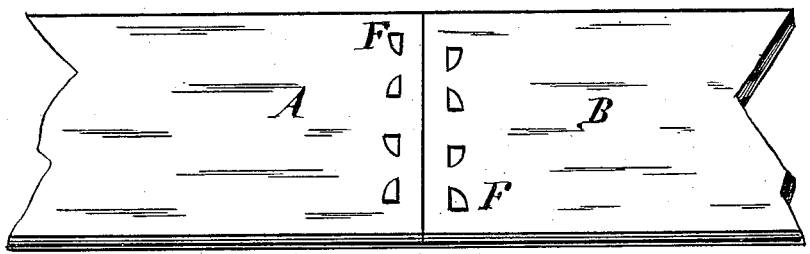
Figure 3:
Figure 4:

Figure 1 is a view of the device as applied to a belt. Fig. 2 is a view of the opposite side of the same. Fig. 3 is a section showing the manner of securing the hooks to the belt. Fig. 4 is a side view of one of the hooks.

The letters A and B denote the two ends of the belt.

C denotes the pivot-wire.

D denotes short hooks, pivoted on the wire, which are provided with points E, which are driven through the belt and clinched down flatwise upon the opposite side, as shown in Fig. 2.

The pivoting of these hooks upon the wire, as shown and described, allows the joint of the belt to bend and conform to the surfaces of the two pulleys in its passage thereover without derangement to the fastening device.

I claim as my invention—

The central wire combined with the hooks pivoted thereon, substantially as shown and described.

WILSON L. POTTER.

Witnesses:
W. E. SIMONDS.
JAMES J. GREENE.